(12) United States Patent
Mimura et al.

(10) Patent No.: US 6,784,320 B2
(45) Date of Patent: Aug. 31, 2004

(54) AMINE RECOVERY METHOD AND APPARATUS AND DECARBONATION APPARATUS HAVING SAME

(75) Inventors: Tomio Mimura, Osaka (JP); Takashi Nojo, Osaka (JP); Kazuo Ishida, Chiyoda-ku (JP); Hiroshi Nakashoji, Chiyoda-ku (JP); Hiroshi Tanaka, Hiroshima (JP); Takuya Hirata, Hiroshima (JP)

(73) Assignees: The Kansai Electric Power Co., Inc., Osaka (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/168,975

(22) PCT Filed: Oct. 24, 2001

(86) PCT No.: PCT/JP01/09310

§ 371 (c)(1),
(2), (4) Date: Aug. 13, 2002

(87) PCT Pub. No.: WO02/34369

PCT Pub. Date: May 2, 2002

(65) Prior Publication Data

US 2003/0045756 A1 Mar. 6, 2003

(30) Foreign Application Priority Data

Oct. 25, 2000 (JP) ........................................ 2000-324965

(51) Int. Cl.[7] ..................... C07C 209/82; C07C 209/84; C07C 209/86; B01D 53/14; B01D 53/15
(52) U.S. Cl. ..................... 564/497; 564/498; 564/437; 564/439; 423/228; 423/229; 96/363; 96/364
(58) Field of Search ............................... 564/497, 498, 564/437, 439; 423/228, 229

(56) References Cited

U.S. PATENT DOCUMENTS 5,318,758 A    6/1994   Fujii et al.

FOREIGN PATENT DOCUMENTS

| EP | 553643 | 8/1993 |
|---|---|---|
| EP | 798029 | 10/1997 |
| JP | 4-161225 | 6/1992 |
| JP | 8-089756 | 4/1996 |
| JP | 10-202054 | 8/1998 |
| JP | 11-137960 | 5/1999 |

*Primary Examiner*—Brian Davis
(74) *Attorney, Agent, or Firm*—Oblon, Spivak, McClelland, Maier & Neustadt, P.C.

(57) ABSTRACT

In a decarbonation process for removing carbon dioxide from a carbon dioxide-containing gas with the use of an amine compound-containing absorbing solution, an amine compound accompanying a decarbonated exhaust gas is efficiently recovered in the following manner: A water washing section is constituted in two stages, a first-stage water washing section 64 and a second-stage water washing section 65. In these water washing sections, recovery of the amine compound accompanying the decarbonated exhaust gas is performed sequentially. Regeneration tower refluxed water is supplied as washing water to the second-stage water washing section 65. Washing water is withdrawn from the second-stage water washing section 65 and supplied to the first-stage water washing section 64. Demisters 83, 84 and 85 are provided at outlets of a carbon dioxide absorption section 73, the first-stage water washing section 64 and the second-stage water washing section 65. An absorbing solution mist and a washing water mist accompanying the decarbonated exhaust gas are removed by these demisters.

7 Claims, 3 Drawing Sheets

AMINE RECOVERY METHOD AND APPARATUS AND DECARBONATION APPARATUS HAVING SAME

TECHNICAL FIELD

This invention relates to an amine recovery method and apparatus, and a decarbonation apparatus having the amine recovery apparatus.

BACKGROUND ART

In recent years, thermal power equipment and boiler equipment have used large amounts of coal, heavy oil or superheavy oil as fuels. From the points of view of air pollution control and Earth environment purification, there have been problems in how to decrease the quantities and concentrations of emissions of sulfur oxides (mainly sulfur dioxide), nitrogen oxides, and carbon dioxide. Suppression of carbon dioxide emission, in particular, has recently been investigated, together with emission control of flon gas and methane gas, from the viewpoint of global warming. For this purpose, methods for removing carbon dioxide, such as PSA (pressure swing) method, membrane separation, and absorption by reaction with basic compounds, are under study.

As an example of a method for removing carbon dioxide with the use of basic compounds, Japanese Unexamined Patent Publication No. 1993-184866 (related U.S. Pat. No. 5,318,758) proposes a method which performs decarbonation by using an aqueous solution of an amine compound (hereinafter referred to simply as an amine) as a solution for absorbing carbon dioxide. In this method, the reaction between carbon dioxide and the amine compound is an exothermic reaction. Thus, the temperature of the absorbing solution in a carbon dioxide absorption section rises to raise the vapor pressure of the amine. That is, the amine-containing absorbing solution evaporates owing to the temperature increase. As a result, the amount of the amine compound accompanying a decarbonated gas increases. Thus, a water washing section is provided in an absorption tower, and the decarbonated gas and washing water are subjected to vapor-liquid contact in the water washing section, whereby the amine compound accompanying the decarbonated gas is recovered into a liquid phase.

Concretely, the above-mentioned Japanese Unexamined Patent Publication No. 1993-184866 discloses a decarbonation apparatus as shown in FIGS. 2 and 3.

In FIG. 2, the reference numeral 1 denotes an absorption tower, 2 a carbon dioxide absorption section, 3 a water washing section, 4 an exhaust gas supply section, 6 is an absorbing solution supply port, 7 a nozzle, 8 a liquid reservoir in the water washing section, 9 a circulating pump, 10 a cooler, 11 a nozzle, 12 an absorbing solution discharge port, 13 a blower, 14 an exhaust gas supply port, 15 an exhaust gas cooler, 16 a circulating pump, 17 a cooler, 18 a nozzle, and 19 a drainage line.

Although a detailed explanation is omitted, a combustion exhaust gas supplied through the exhaust gas supply port 14 is cooled by the cooling tower 15, and then fed to the absorption tower 1. In the carbon dioxide absorption section 2 of the absorption tower 1, the fed combustion exhaust gas is brought into countercurrent contact with an absorbing solution supplied through the absorbing solution supply port via the nozzle 7. As a result, carbon dioxide in the combustion exhaust gas is absorbed and removed by the absorbing solution. The loaded absorbing solution, which has absorbed carbon dioxide, is sent to a regeneration tower (not shown) through the absorbing solution discharge port 12. In the regeneration tower, the loaded absorbing solution is regenerated, and fed again from the absorbing solution supply port 6 to the absorption tower 1.

On the other hand, the combustion exhaust gas decarbonated in the carbon dioxide absorption section (i.e., decarbonated exhaust gas) ascends, accompanied by a large amount of an amine vapor, due to a temperature rise ascribed to an exothermic reaction between carbon dioxide and an amine compound in the carbon dioxide absorption section 2. The ascending decarbonated exhaust gas passes through the liquid reservoir 8, and heads toward the water washing section 3. In the water washing section 3, reserved water in the liquid reservoir 8 is transported by the circulating pump 9, cooled by the cooler 10, and then supplied to the water washing section 3 as washing water through the nozzle 11. As a result, this washing water and the decarbonated exhaust gas make countercurrent contact in the water washing section 3, whereby the amine compound in the decarbonated exhaust gas is recovered into the liquid phase.

FIG. 3 is characterized by improving the amine recovering ability by utilization of regeneration tower refluxed water. In FIG. 3, the reference numeral 21 denotes an absorption tower, 22 a carbon dioxide absorption section, 23 a water washing section, 24 an exhaust gas supply port, 25 an exhaust gas discharge port, 26 an absorbing solution supply port, 27 a nozzle, 28 a regeneration tower refluxed withdrawn water supply port, 29 a nozzle, 30 a cooler, 31 a nozzle, 32 a charging section, 33 a circulating pump, 34 a make-up water supply line, 35 an absorbing solution discharge pump, 36 a heat exchanger, 37 a cooler, 38 a regeneration tower, 39 a nozzle, 40 a lower charging section, 41 a reboiler, 42 an upper charging section, 43 a refluxed water pump, 44 a carbon dioxide separator, 45 a carbon dioxide discharge line, 46 a cooler, 47 a nozzle, 48 a refluxed water supply line, and 49 a combustion gas supply blower.

Although a detailed explanation is omitted, a combustion exhaust gas supplied by the combustion gas supply blower 49 is cooled by the cooling tower 30, and then fed to the absorption tower 21. In the carbon dioxide absorption section 22 of the absorption tower 21, the fed combustion exhaust gas is brought into countercurrent contact with an absorbing solution supplied through the absorbing solution supply port 26 via the nozzle 27. As a result, carbon dioxide in the combustion exhaust gas is absorbed and removed by the absorbing solution. The loaded absorbing solution, which has absorbed carbon dioxide, is sent to the regeneration tower 38 by the absorbing solution discharge pump 35 through the absorbing solution discharge port 12. In the regeneration tower 38, the loaded absorbing solution is regenerated, and fed again to the absorption tower 21 through the absorbing solution supply port 26.

On the other hand, the combustion exhaust gas decarbonated in the carbon dioxide absorption section 22 (i.e., decarbonated exhaust gas) ascends, accompanied by a large amount of an amine vapor, owing to a temperature rise ascribed to an exothermic reaction between carbon dioxide and an amine compound in the carbon dioxide absorption section 22. The ascending decarbonated exhaust gas heads toward the water washing section 23. In the water washing section 23, part of regeneration tower refluxed water withdrawn as washing water is supplied to the water washing section 23 through the regeneration tower refluxed withdrawn water supply port 28 via the nozzle 29. As a result, this washing water and the decarbonated exhaust gas make countercurrent contact in the water washing section 23, whereby the amine compound in the decarbonated exhaust gas is recovered into the liquid phase.

However, according to the above-described conventional decarbonation apparatus shown in FIG. 2, in particular, the water washing section is provided as one stage. Thus, the concentration of amine recovered by the washing water is so high that the recovery of amine is insufficient. As a result, amine accompanies the decarbonated exhaust gas, and is released to the outside of the decarbonation process system. Consequently, amine is wasted, causing a concern about an increase in the operating cost, etc.

The present invention has been accomplished in the light of the foregoing problems. Its object is to provide an amine recovery method and apparatus, and a decarbonation apparatus equipped with the amine recovery apparatus, the amine recovery method and apparatus being capable of efficiently recovering an amine compound accompanying a decarbonated exhaust gas in a decarbonation process in which carbon dioxide is removed from a gas containing carbon dioxide with the use of an amine compound-containing absorbing solution.

DISCLOSURE OF THE INVENTION

An amine recovery method as a first invention for solving the above problems is an amine recovery method for recovering an amine compound accompanying a decarbonated exhaust gas by bringing the decarbonated exhaust gas into vapor-liquid contact with washing water in a water washing section, the decarbonated exhaust gas having had carbon dioxide absorbed and removed by vapor-liquid contact with an absorbing solution containing the amine compound in a carbon dioxide absorption section, characterized in that the water washing section is constituted in a plurality of stages, and recovery of the amine compound accompanying the decarbonated exhaust gas is performed sequentially in the water washing sections in the plural stages.

Thus, according to the amine recovery method as the first invention, the water washing section is constituted in a plurality of stages, and recovery of the amine compound accompanying the decarbonated exhaust gas is performed sequentially in the water washing sections in the plural stages. Consequently, the amine compound accompanying the decarbonated exhaust gas can be recovered very efficiently, and the operating cost can be reduced.

An amine recovery method as a second invention is the amine recovery method of the first invention, characterized in that regeneration tower refluxed water is supplied as washing water to the water washing section.

Thus, according to the amine recovery method of the second invention, the concentration of amine contained in washing water of the water washing section is decreased, and the amine recovery ability is further enhanced.

An amine recovery method as a third invention is the amine recovery method of the first or second invention, characterized in that washing water is withdrawn from the water washing section in the succeeding stage and supplied to the water washing section in the preceding stage.

Thus, according to the amine recovery method of the third invention, the concentration of amine contained in washing water of the water washing section in the preceding stage is decreased to enhance the amine recovery ability in the water washing section in the preceding stage. In accordance with this advantage, the concentration of amine contained in washing water of the water washing section in the succeeding stage is also further decreased to further enhance the amine recovery ability as a whole.

An amine recovery method as a fourth invention is the amine recovery method of the first, second or third invention, characterized in that demisters are provided at outlets of the carbon dioxide absorption section and the water washing sections in the respective stages, and an absorbing solution mist and a washing water mist accompanying the decarbonated exhaust gas are removed by the demisters.

Thus, according to the amine recovery method of the fourth invention, it can be prevented that part of the absorbing solution mist fed to the carbon dioxide absorption section and part of the washing water mist fed to the water washing sections in the respective stages are released to the outside of the system together with the decarbonated exhaust gas, causing losses in water and amine compound.

An amine recovery apparatus as a fifth invention is an amine recovery apparatus for recovering an amine compound accompanying a decarbonated exhaust gas by bringing the decarbonated exhaust gas into vapor-liquid contact with washing water in a water washing section, the decarbonated exhaust gas having had carbon dioxide absorbed and removed by vapor-liquid contact with an absorbing solution containing the amine compound in a carbon dioxide absorption section, characterized in that the water washing section is constituted in a plurality of stages, and recovery of the amine compound accompanying the decarbonated exhaust gas is performed sequentially in the water washing sections in the plural stages.

Thus, according to the amine recovery apparatus of the fifth invention, the water washing section is constituted in a plurality of stages, and recovery of the amine compound accompanying the decarbonated exhaust gas is performed sequentially in the water washing sections in the plural stages. Consequently, the amine compound accompanying the decarbonated exhaust gas can be recovered very efficiently, and the operating cost can be reduced.

An amine recovery apparatus as a sixth invention is the amine recovery apparatus of the fifth invention, characterized in that regeneration tower refluxed water is supplied as washing water to the water washing section.

Thus, according to the amine recovery apparatus of the sixth invention, the concentration of amine contained in washing water of the water washing section is decreased, and the amine recovery ability is further enhanced.

An amine recovery apparatus as a seventh invention is the amine recovery apparatus of the fifth or sixth invention, characterized in that washing water is withdrawn from the water washing section in the succeeding stage and supplied to the water washing section in the preceding stage.

Thus, according to the amine recovery apparatus of the seventh invention, the concentration of amine contained in washing water of the water washing section in the preceding stage is decreased to enhance the amine recovery ability in the water washing section in the preceding stage. In accordance with this advantage, the concentration of amine contained in washing water of the water washing section in the succeeding stage is also further decreased to further enhance the amine recovery ability as a whole.

An amine recovery apparatus as an eighth invention is the amine recovery apparatus of the fifth, sixth or seventh invention, characterized in that demisters are provided at outlets of the carbon dioxide absorption section and the water washing sections in the respective stages, and an absorbing solution mist and a washing water mist accompanying the decarbonated exhaust gas are removed by the demisters.

Thus, according to the amine recovery apparatus of the eighth invention, it can be prevented that part of the absorbing solution mist fed to the carbon dioxide absorption section and part of the washing water mist fed to the water washing sections in the respective stages are released to the outside of the system together with the decarbonated exhaust gas, causing losses in water and amine compound.

A decarbonation apparatus as a ninth invention is characterized by having the amine recovery apparatus of the fifth, sixth, seventh or eighth invention in an absorption tower.

Thus, the decarbonation apparatus of the ninth invention has the amine recovery apparatus of the fifteenth, sixth, seventh or eighth invention in an absorption tower. Hence, the decarbonation apparatus is an apparatus with a high ability to recover the amine compound and involving a low operating cost.

BEST MODE FOR CARRYING OUT THE INVENTION

An embodiment of the present invention will now be described in detail based on the accompanying drawings.

Figure 1:
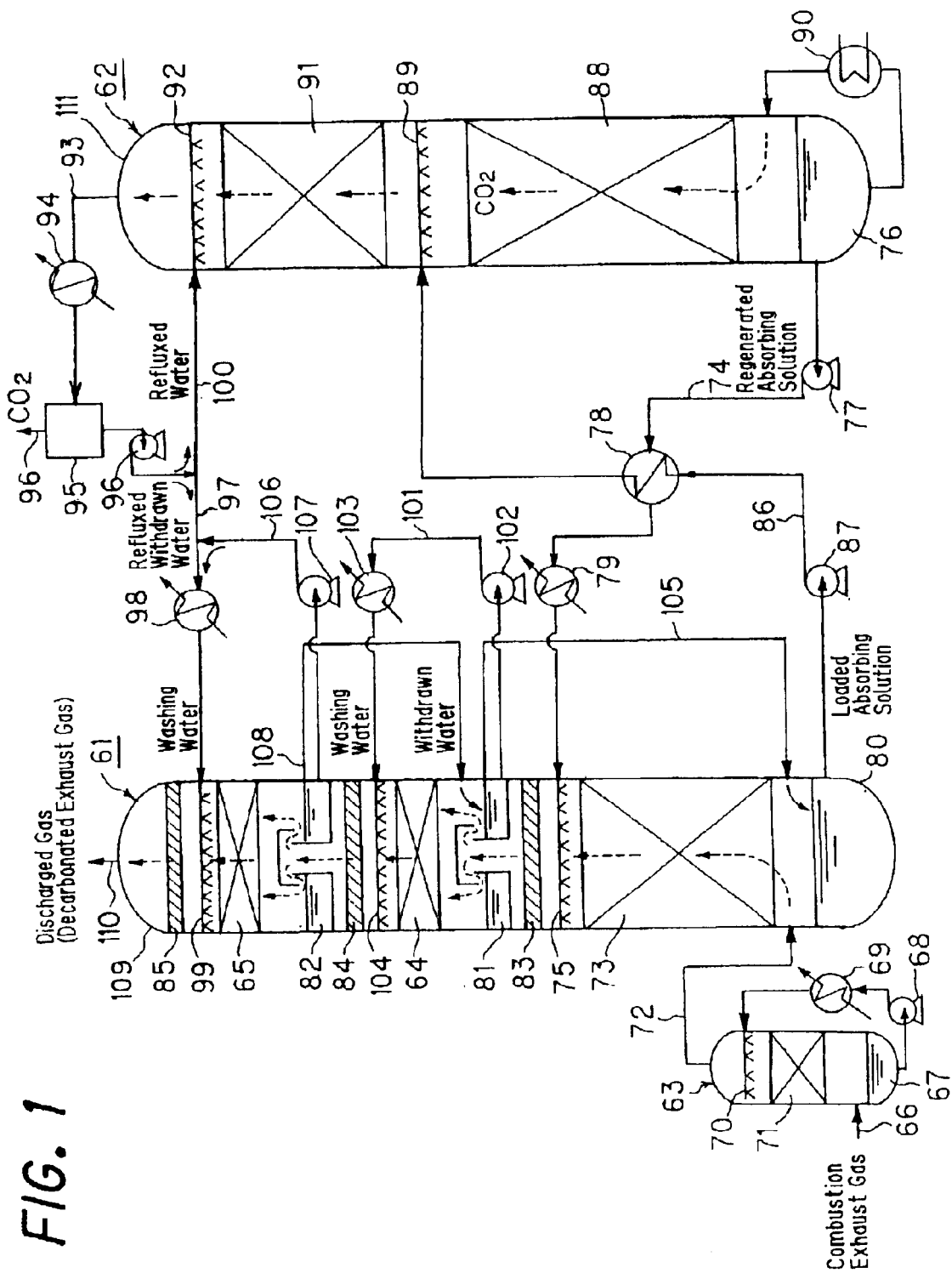
FIG. 1 is a configuration drawing showing a main portion of a decarbonation apparatus according to an embodiment of the present invention.
Figure 2:
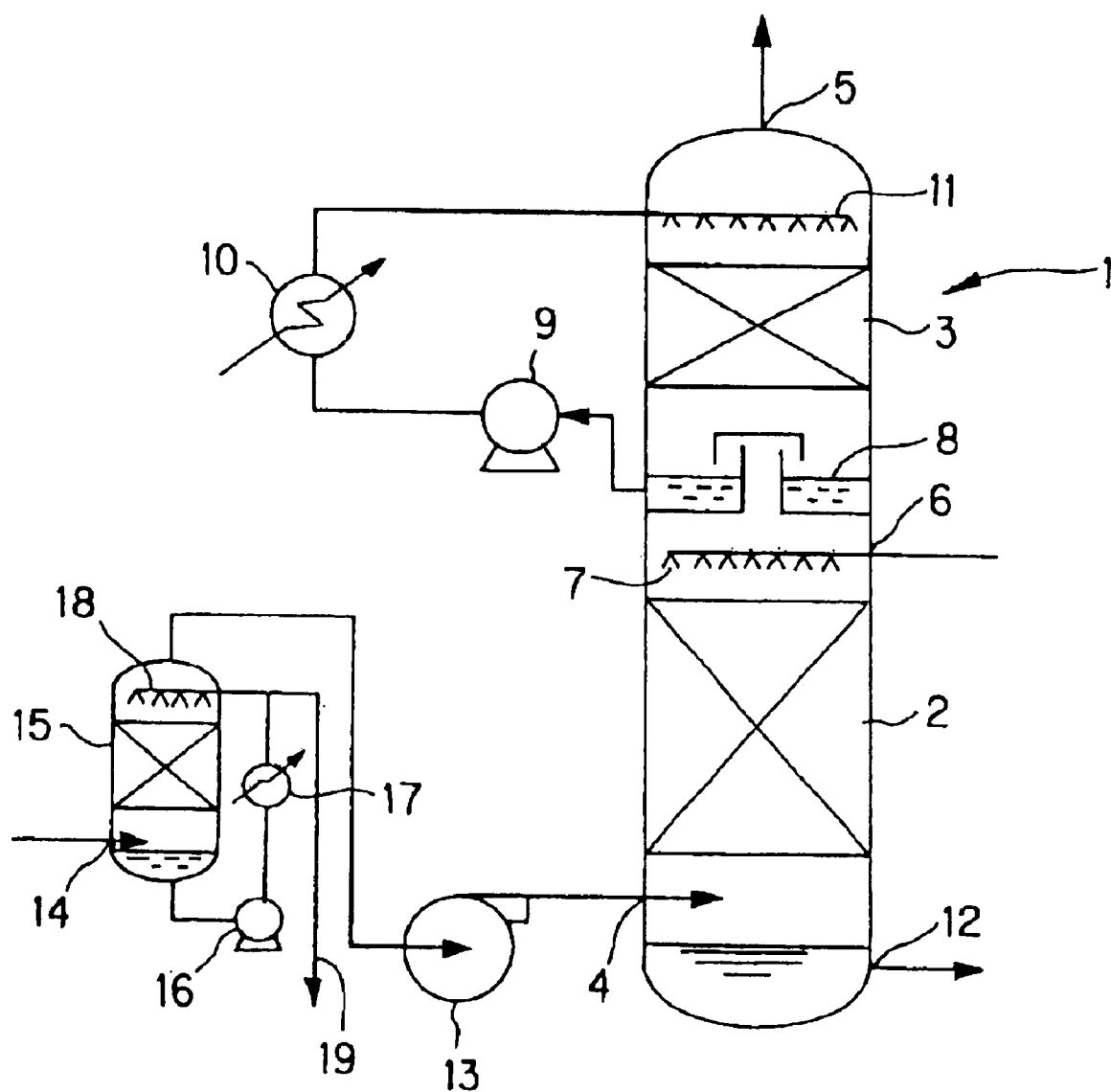
FIG. 2 is a configuration drawing showing a main portion of a conventional decarbonation apparatus.
Figure 3:
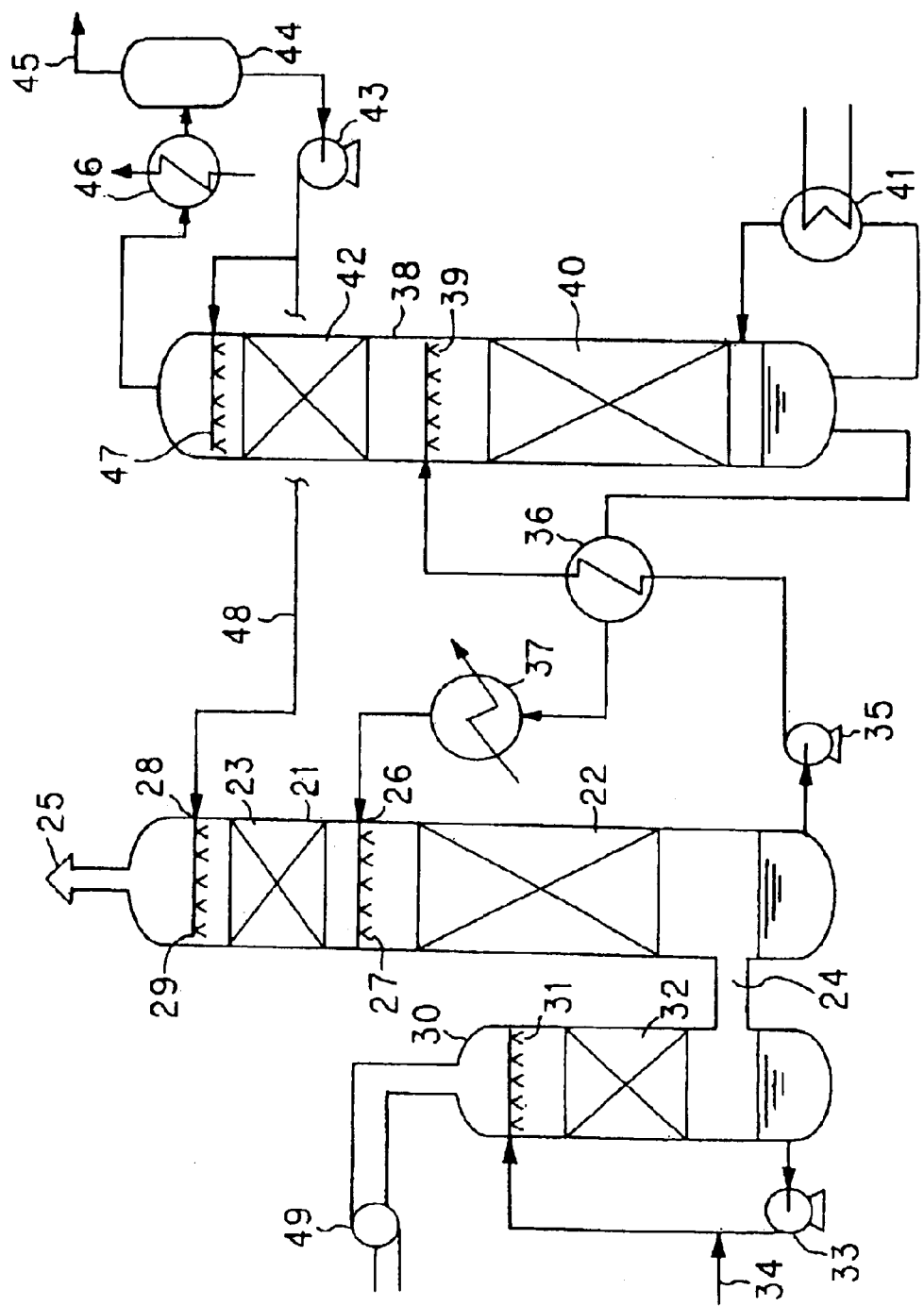
FIG. 3 is a configuration drawing showing a main portion of a conventional decarbonation apparatus.

FIG. 1 is a configuration drawing showing a main portion of a decarbonation apparatus according to the embodiment of the present invention. As shown in FIG. 1, the decarbonation apparatus of the present embodiment has an absorption tower 61, a regeneration tower 62, and a cooling tower 63.

Although details will be described later, the decarbonation apparatus of the present embodiment is characterized in that a water washing section of the absorption tower 61 has a two-stage structure, i.e., a first-stage water washing section 64 and a second-stage water washing section 65; that washing water of the second-stage water washing section 65 is withdrawn and supplied to the first-stage water washing section 64; that regeneration tower ref luxed water is supplied as washing water to the second-stage water washing section; and that demisters 83, 84 and 85 are installed at outlets of a carbon dioxide absorption section 73, the first-stage water washing section 64 and the second-stage water washing section 65.

In detail, a combustion exhaust gas generated in thermal power equipment or boiler equipment is supplied to the cooling tower 63 via an exhaust gas supply line 66. Water is stored at the bottom 67 of the cooling tower 63. This water is scooped up by a circulating pump 68, cooled by a heat exchanger 69, and then supplied to a charging section 71 through a nozzle 70. As a result, the combustion exhaust gas is cooled in the charging section 71 upon countercurrent contact with cooling water diffused from the nozzle 70. Then, the combustion exhaust gas is supplied through an exhaust gas supply line 72 to the carbon dioxide absorption section 73 provided in a lower portion of the absorption tower 61.

The combustion exhaust gas supplied to the absorption tower 61 ascends within the absorption tower as indicated by dotted arrows in the drawing. On the other hand, a regenerated absorbing solution (an aqueous solution of an amine compound) reserved at the bottom 76 of the regeneration tower 62 is transported by an absorbing solution supply pump 77 provided in an absorbing solution supply line 74. The transported regeneration absorbing solution is cooled by a heat exchanger 78 and a heat exchanger 79, and then supplied to the carbon dioxide absorption section 73 through a nozzle 75 provided at the outlet of the carbon dioxide absorption section 73. As a result, the combustion exhaust gas and the absorbing solution make vapor-liquid contact (countercurrent contact) in the carbon dioxide absorption section 73. Thus, carbon dioxide contained in the combustion exhaust gas is absorbed into the absorbing solution and removed thereby.

Examples of the amine compound contained in the absorbing solution are alcoholic hydroxyl group-containing primary amines such as monoethanolamine and 2-amino-2-methyl-1-propanol, alcoholic hydroxyl group-containing secondary amines such as diethanolamine and 2-methylaminoethanol, alcoholic hydroxyl group-containing tertiary amines such as triethanolamine and N-methyldiethanolamine, polyethylenepolyamines such as ethylenediamine, triethylenediamine and diethylenetriamine, cyclic amines such as piperazines, piperidines and pyrrolidines, polyamines such as xylylenediamine, amino acids such as methylaminocarboxylic acid, and mixtures of them. Any of these amines is used usually as 10 to 70% by weight of an aqueous solution. To the absorbing solution, carbon dioxide absorption promoters or corrosion inhibitors may be added, and methanol, polyethylene glycol and sulfolane may be added as other media.

The loaded absorbing solution, which has absorbed carbon dioxide, flows downward, and is stored at the bottom 80 of the absorption tower. Then, the stored solution is discharged by an absorbing solution discharge pump 87 provided in an absorbing solution discharge line 86, and is heated upon heat exchange with the regenerated absorbing solution in the heat exchanger 78. Then, the heated solution is diffused from a nozzle 89 provided at the outlet of a lower charging section 88 of the regeneration tower 62, flows down the lower charging section 88, and is stored at the bottom 76 of the regeneration tower.

The loaded absorbing solution stored at the bottom 76 of the regeneration tower is heated to, for example, about 120° C. by feed steam in a reboiler 90. As a result, carbon dioxide in the loaded absorbing solution is released to regenerate the absorbing solution. This regenerated absorbing solution is stored at the bottom 76 of the regeneration tower, and supplied again to the carbon dioxide absorption section 73 of the absorption tower 61. That is, the absorbing solution is used in a circulated manner, and need not be discharged to the outside or supplied from the outside, unless any loss occurs. On the other hand, the carbon dioxide released ascends as indicated by dotted arrows in the drawing, passes through the lower charging section 88 and an upper charging section 91, and is discharged to the outside of the regeneration tower through a carbon dioxide discharge line 93 at the top 111 of the regeneration tower.

Since the carbon dioxide at this time contains moisture, it is cooled by a condenser (cooler) 94 provided in the carbon dioxide discharge line 93 to condense moisture contained in the carbon dioxide. The resulting condensate and carbon dioxide are separated by a carbon dioxide separator 95. High purity carbon dioxide separated from the condensate is released to the outside of the decarbonation process system (hereinafter referred to simply as the outside of the system) through a carbon dioxide release line 96, and is utilized in a subsequent step or disposed of. The condensate is transported by a circulating pump 96, and part of it is withdrawn toward a regeneration tower refluxed water supply line 97. This regeneration tower refluxed withdrawn water is cooled by a heat exchanger 98, and then supplied as washing water to the top of the second-stage water washing section 65 through a nozzle 99 provided at the outlet of the second-stage water washing section 65. This regeneration tower refluxed withdrawn water has a very low amine concentration. The remainder of the condensate is ref luxed to the regeneration tower 62. That is, it is supplied to the top of the upper charging section 91 through a nozzle 92 via a reflux line 100, flowed downward, and reserved at the bottom 76 of the regeneration tower.

On the other hand, the combustion exhaust gas deprived of carbon dioxide (i.e., decarbonated exhaust gas) in the carbon dioxide absorption section 73 of the absorption tower 61 passes through the demister 83 provided at the outlet of the carbon dioxide absorption section 73, and flows into the first-stage water washing section 64. At this time, the decarbonated exhaust gas is accompanied by a large amount of an amine vapor. That is, the temperature rises because of the exothermic reaction between carbon dioxide and the amine compound in the carbon dioxide absorption section 73, so that a large amount of the absorbing solution evaporates, ascending together with the decarbonated exhaust gas. The moisture accompanying the decarbonated exhaust gas at this time becomes a supply source for washing water in the water washing section to be described later. The temperature of the decarbonated exhaust gas, flowing into the first-stage water washing section 64, is about 50 to 80° C., for example.

The demister 83 removes a mist of the absorbing solution accompanying the decarbonated exhaust gas. That is, the absorbing solution is diffused from the nozzle 75 as a mist, and part of this absorbing solution mist accompanies the decarbonated exhaust gas and ascends. If the absorbing solution mist is released, unchanged, to the outside of the absorption tower along with the decarbonated exhaust gas, there will be a loss of the amine compound. Thus, the demister 83 is provided at the outlet of the carbon dioxide absorption section to remove the absorbing solution mist accompanying the decarbonated exhaust gas. The moisture (absorbing solution) removed by the demister 83 flows downward, and is reserved at the bottom 80 of the absorption tower.

In the first-stage water washing section 64, reserved water in a liquid reservoir 81 in the first-stage water washing section 64 is transported by a circulating pump 102 provided in a circulation line 101. The transported water is cooled by a heat exchanger 103, and then supplied as washing water to the top of the first-stage water washing section 64 through a nozzle 104 provided at the outlet of the first-stage water washing section 64. As a result, the washing water and the decarbonated exhaust gas make countercurrent contact in the first-stage water washing section 64. Consequently, the temperature of the decarbonated exhaust gas lowers, whereupon a water vapor accompanying the decarbonated exhaust gas condenses. Also, the amine compound accompanying the decarbonated exhaust gas is recovered. The resulting condensate and the diffused washing water flow downward, and are stored in the liquid reservoir 81.

The reserved water in the liquid reservoir 81 is maintained at a constant water level. That is, when the reserved water in the liquid reservoir 81 increases and reaches more than the constant water level, the reserved water is overflowed to the bottom 80 of the absorption tower via a reserved water discharge line 105. The reserved water in the liquid reservoir 81 may be transported to the bottom 80 of the absorption tower by a pump.

Most of the amine compound accompanying the decarbonated exhaust gas is recovered in the first-stage water washing section 64. At this time, the amine concentration of the reserved water (washing water) in the liquid reservoir 81 is high. Thus, the amine vapor pressure becomes so high because of vapor-liquid equilibrium that the amine concentration in the decarbonated exhaust gas cannot be decreased any further. That is, the single-stage water washing section alone cannot fully decrease the amine concentration in the decarbonated exhaust gas. In the present embodiment, therefore, the water washing section has a two-stage structure, the first-stage water washing section 64 and the second-stage water washing section 65. The decarbonated exhaust gas having amine recovered in the first-stage water washing section 64 passes through the demister 84 provided at the outlet of the first-stage water washing section 64, and flows to the second-stage water washing section 65.

The demister 84 removes a mist of the washing water accompanying the decarbonated exhaust gas. That is, the washing water is diffused from the nozzle 104 as a mist, and part of this washing water mist accompanies the decarbonated exhaust gas and ascends. If the washing water mist is released, unchanged, to the outside of the absorption tower along with the decarbonated exhaust gas, there will be a loss of the amine compound. Thus, the demister 84 is provided at the outlet of the first-stage water washing section to remove the washing water mist accompanying the decarbonated exhaust gas. The moisture (washing water) removed by the demister 83 flows downward, and is reserved in the liquid reservoir 81.

In the second-stage water washing section 65, reserved water in a liquid reservoir 82 in the second-stage water washing section 65 is transported by a circulating pump 107 provided in a circulation line 106. The transported water is cooled by the heat exchanger 98, and then supplied as washing water to the top of the second-stage water washing section 65 through the nozzle 99 provided at the outlet of the second-stage water washing section 65. The regeneration tower refluxed withdrawn water supplied from the regeneration tower also merges into this washing water. As a result, the combined washing water and the decarbonated exhaust gas make countercurrent contact in the second-stage water washing section 65. Consequently, the amine compound accompanying the decarbonated exhaust gas is recovered.

Most of the amine compound accompanying the decarbonated exhaust gas is recovered in the first-stage water washing section 64. In the second-stage water washing section 65, therefore, the amine concentration of the liquid reservoir 82, namely, the concentration of the amine contained in the washing water supplied through the nozzle 99, is kept very low. Thus, in the second-stage water washing section 65, the amine concentration in the decarbonated exhaust gas is fully decreased because of vapor-liquid equilibrium. That is, in the second-stage water washing section 65, the amine compound can be further recovered from the decarbonated exhaust gas released from the first-stage water washing section 64, so that the amine concentration in the decarbonated exhaust gas can be fully decreased.

Furthermore, washing water in the second-stage water washing section 65 is withdrawn and supplied to the first-stage water washing section 64. Concretely, part of the reserved water (washing water) in the liquid reservoir 82 is withdrawn, and supplied to the liquid reservoir 81 of the first-stage water washing section 64. That is, the reserved water in the liquid reservoir 82 is maintained at a constant water level. When the reserved water in the liquid reservoir 82 increases and reaches higher than the constant water level, the reserved water is overflowed to the liquid reservoir 81 via a reserved water discharge line 108. However, this mode is not restrictive, and the reserved water (washing water) in the liquid reservoir 82 may be supplied to the liquid reservoir 81 by a pump.

The decarbonated exhaust gas having amine recovered in the second-stage water washing section 65 passes through the demister 85 provided at the outlet of the second-stage water washing section 65, and is released to the outside of the system through a gas release line 110 at the top 109 of the absorption tower. The amine concentration in the decarbonated exhaust gas released to the outside of the system is a very low value.

The demister 85 removes a mist of the washing water accompanying the decarbonated exhaust gas. That is, the washing water is diffused from the nozzle 99 as a mist, and part of this washing water mist accompanies the decarbonated exhaust gas and ascends. If the washing water mist is released, unchanged, to the outside of the absorption tower along with the decarbonated exhaust gas, there will be a loss of the amine compound. Thus, the demister 85 is provided at the outlet of the second-stage water washing section to remove the washing water mist accompanying the decarbonated exhaust gas. The moisture removed by the demister 85 flows downward, and is reserved in the liquid reservoir 82.

The cooling ability of the heat exchanger 98, for example, is adjusted so that the amount of moisture brought from the exhaust gas supply line 72 into the absorption tower together with the combustion exhaust gas, and the amount of moisture brought through the gas release line 110 to the outside of the absorption tower together with the combustion exhaust gas are made equal to maintain water balance. This measure makes water discharge to the outside or water supply from the outside unnecessary unless there is a loss.

Moreover, the cooling ability of the heat exchanger 98 and so on are adjusted so that the temperature of the decarbonated exhaust gas released through the gas release line 110 is equal to the temperature at the inlet of the second-stage water washing section 65. In this case, the temperatures at the outlet and the inlet of the second-stage water washing section 65 are equal. Thus, steam in the decarbonated exhaust gas in the second-stage water washing section 65 does not condense, and only the amount of water corresponding to the regeneration tower ref luxed withdrawn water overflows and is fed to the liquid reservoir 81 of the first-stage water washing section 64. This mode is not necessarily restrictive, and the outlet temperature of the second-stage water washing section 65 may be adjusted to be lower than its inlet temperature to cause condensation of moisture in the decarbonated exhaust gas even in the second-stage water washing section 65. Through this means, the amount of the resulting condensate may be adapted to overflow the liquid reservoir 82 and be supplied to the liquid reservoir 81 of the first-stage water washing section 64.

As described in detail above, according to the present embodiment, the water washing section has the two-stage structure, i.e., the first-stage water washing section 64 and the second-stage water washing section 65, whereby the decarbonated exhaust gas is subjected to amine recovery in the first-stage water washing section 64, and then further subjected to amine recovery in the second-stage water washing section 65 as well. Thus, the amine compound accompanying the decarbonated exhaust gas can be recovered very efficiently, and the operating cost can be reduced.

Additionally, if the water washing section remains a one-stage structure and is given a large height only, recovery performance for the amine compound improves. However, the amine concentration in the washing water in the water washing section becomes so high that the amine concentration in the decarbonated exhaust gas cannot be made sufficiently low because of vapor-liquid equilibrium. These facts show that constructing the water washing section in the two-stage form is a very effective means.

According to the present embodiment, moreover, washing water in the second-stage water washing section 65 is withdrawn and supplied to the first-stage water washing section 64, whereby the concentration of amine contained in the washing water in the first-stage water washing section 64 is decreased to enhance the amine recovery ability in the first-stage water washing section 64. In accordance with this advantage, the concentration of amine contained in the washing water in the second-stage water washing section 65 is further decreased to further enhance the amine recovery ability as a whole.

According to the present embodiment, moreover, regeneration tower refluxed water is supplied, as washing water, to the second-stage water washing section 65, whereby the concentration of amine contained in the washing water in the second-stage water washing section 65 is further decreased to further enhance the amine recovery ability in the second-stage water washing section 65. Furthermore, washing water in the second-stage water washing section 65 is withdrawn and supplied to the first-stage water washing section 64, whereby the concentration of amine contained in the washing water in the first-stage water washing section 64 is decreased to enhance the amine recovery ability in the first-stage water washing section 64.

It is desirable that as described above, regeneration tower refluxed water is supplied to the second-stage water washing section 65, and washing water in the second-stage water washing section 65 is withdrawn and supplied to the first-stage water washing section 64. However, this mode is not necessarily restrictive. Instead, regeneration tower refluxed water may be supplied to the second-stage water washing section 65 and the first-stage water washing section 64 at the same time.

According to the present embodiment, moreover, the demisters 83, 84 and 85 are installed at the outlets of the carbon dioxide absorption section 73, first-stage water washing section 64 and second-stage water washing section 65. This means can prevent the situation that part of the absorbing solution mist fed to the carbon dioxide absorption section 73 and part of the washing water mist fed to each of the first-stage water washing section 64 and the second-stage water washing section 65 are released to the outside of the absorption tower together with the decarbonated exhaust gas, causing losses in water and amine compound.

The decarbonation apparatus equipped with the amine recovery apparatus described above is an apparatus with a high ability to recover the amine compound and involving a low operating cost.

The first-stage water washing section 64 and the second-stage water washing section 65 may be in a packed tower or in a tower with trays.

In the above embodiment, the water washing section is formed as the two-stage structure. However, this is not necessarily restrictive, and the water washing section may have a structure comprising a plurality of stages not less than three stages. In this case as well, the decarbonated exhaust gas containing an amine compound is subjected to amine recovery in the water washing section at a preceding stage (a stage upstream from a decarbonated exhaust gas flow), and then is further subjected to amine recovery in the water washing section at a succeeding stage (a stage downstream from the decarbonated exhaust gas flow). That is, recovery of the amine compound accompanying the decarbonated exhaust gas is performed sequentially in plural stages of water washing sections. In this case, the regeneration tower ref luxed withdrawn water may be supplied to the water washing section in the rearmost stage among the plural-stage water washing sections, and washing water may be withdrawn from the rearmost-stage water washing section and supplied to the water washing section in the stage preceding it, further withdrawn from the water washing section in this stage and supplied to the water washing section preceding to it, and so on.

In the above embodiment, absorption of carbon dioxide contained in the combustion exhaust gas of fuel is taken as an example for explanation. However, this is not restrictive, and the carbon dioxide-containing gas to be decarbonated may be a process gas such as a fuel gas, and other various gases can be applied. The pressure of the carbon dioxide-containing gas to be decarbonated may be an applied pressure or an atmospheric pressure, and its temperature may be a low temperature or a high temperature, without any restrictions. The combustion exhaust gas at atmospheric pressure is preferred.

[Explanation for Concrete Experiment Examples]

The present invention will be described concretely by an experimental example, which in no way limit the present invention.

<Experimental Example>

The following experiments were conducted as the method of the present invention: 30 $Nm^3/h$ of a combustion exhaust gas containing 10% carbon dioxide was supplied to the carbon dioxide absorption section 73 of the absorption tower 61, and brought into countercurrent contact with an aqueous solution of an alcoholic hydroxyl group-containing secondary amine (i.e., an absorbing solution) to absorb carbon dioxide to the aqueous solution. The residual decarbonated exhaust gas was fed to the demister 83 at the outlet of the carbon dioxide absorption section, then brought into countercurrent contact with washing water at a liquid/gas ratio of 2.2 $l/Nm^3$ in the first-stage water washing section 64, and passed through the demister 84 at the outlet of the first-stage water washing section. Further, the decarbonated exhaust gas was brought into countercurrent contact with washing water at a liquid/gas ratio of 2.2 $l/Nm^3$ in the second-stage water washing section 65, passed through the demister 85 at the outlet of the second-stage water washing section, and released to the outside of the system. During this procedure, the operation was performed such that the temperature of the gas at the outlet of the first-stage water washing section and the temperature of the gas at the outlet of the second-stage water washing section were both 46° C. Also, regeneration tower ref luxed withdrawn water was fed at 1.1 l/h to the second-stage water washing section 65, while washing water of the second-stage water washing section 65 was withdrawn and supplied to the first-stage water washing section 64. As a result, the amine concentration in the decarbonated exhaust gas released from the absorption tower 61 to the outside of the system was 8 ppm.

<Comparative Example 1>

The same procedure as in the above experimental example was performed, except that the water washing section was a one-stage structure, and the regeneration tower refluxed withdrawn water was supplied to the one-stage water washing section, as the conventional method. As a result, the amine concentration in the decarbonated exhaust gas released from the absorption tower 61 to the outside of the system was 25 ppm, a higher value than in the above-mentioned Example.

<Comparative Example 2>

The same procedure as in the above experimental example was performed, except that the liquid withdrawn from the second-stage water washing section (washing water) was not supplied to the first-stage water washing section 64. As a result, the amine concentration in the decarbonated exhaust gas released from the absorption tower to the outside of the system was 11 ppm. This value was sufficiently low compared with the above Comparative Example 1, but was higher than in the above-mentioned experimental example. These findings were able to confirm the effectiveness of withdrawing washing water of the second-stage water washing section 65 and supplying it to the first-stage water washing section 64.

The results of the Experimental Example and Comparative Examples 1 and 2 are summarized in [Table 1]. By constituting the water washing section into the two-stage structure, the concentration of amine released to the outside of the system can be made sufficiently low. Also, washing water of the second-stage water washing section 65 is withdrawn and supplied to the first-stage water washing section 64, whereby the concentration of amine released to the outside of the system can be made even lower.

TABLE 1

| | Exp. Ex. 1 | Comp. Ex. 1 | Comp. Ex. 2 |
|---|---|---|---|
| First-stage water washing section liquid/gas ratio (1/$Nm^3$) | 2.2 | 2.2 | 2.2 |
| First-stage water washing section outlet gas temperature (° C.) | 46 | 46 | 46 |
| Second-stage water washing section liquid/gas ratio (1/$Nm^3$) | 2.2 | — | 2.2 |
| Second-stage water washing section outlet gas temperature (° C.) | 46 | — | 46 |
| Regeneration tower refluxed withdrawn water flow rate (1/h) | 1.1 | 1.1 | 1.1 |
| Supply of second-stage water washing section withdrawn liquid to first-stage water washing section | Yes | — | No |
| Amine concentration of carbon dioxide absorption tower outlet gas (ppm) | 8 | 25 | 11 |

Industrial Applicability

As described above, the present invention relates to an amine recovery method and apparatus, and a decarbonation apparatus equipped with the amine recovery apparatus. This invention is useful when applied to recovering an amine compound accompanying a decarbonated exhaust gas in a decarbonation process in which carbon dioxide is removed from a gas containing carbon dioxide with the use of an amine compound-containing absorbing solution.

What is claimed is:

1. An amine recovery method for recovering an amine compound accompanying a decarbonated exhaust gas formed by removing carbon dioxide from an exhaust gas by vapor-liquid contact with an absorbing solution containing the amine compound in a carbon dioxide absorption section, comprising bringing the decarbonated exhaust gas into vapor-liquid contact with washing water in a water washing section wherein said bringing includes performing said bringing in a plurality of stages and diluting the washing water before supplying to each of the plurality of stages where the amine compound accompanying the decarbonated exhaust gas is sequentially recovered.

2. The amine recovery method of claim 1, wherein said bringing includes supplying regeneration tower refluxed water as the washing water to the water washing section.

3. The amine recovery method of claim 1, wherein said diluting includes withdrawing the washing water from the water washing section in one of the plurality of stages and supplying the washing water to the water washing section in a stage preceding said one of the plurality of stages.

4. The amine recovery method of claim 1, further comprising providing demisters at outlets of the carbon dioxide absorption section and the water washing section in each of the plurality of stages, said demisters being configured to remove an absorbing solution mist and a washing water mist accompanying the decarbonated exhaust gas.

5. The amine recovery method of claim 2, wherein said diluting includes withdrawing washing water from the water washing section in one of the plurality of stages and supplying the washing water to the water washing section in a stage preceding said one of the plurality of stages.

6. The amine recovery method of claim 2, further comprising providing demisters at outlets of the carbon dioxide absorption section and the water washing section in each of the plurality of stages, said demisters being configured to remove an absorbing solution mist and a washing water mist accompanying the decarbonated exhaust gas.

7. The amine recovery method of claim 3, further comprising providing demisters at outlets of the carbon dioxide absorption section and the water washing section in each of the plurality of stages, said demisters being configured to remove an absorbing solution mist and a washing water mist accompanying the decarbonated exhaust gas.

* * * * *